H. K. HEDGES.
WALKING ATTACHMENT FOR MOTOR CARS.
APPLICATION FILED NOV. 6, 1916.
1,229,954. Patented June 12, 1917.
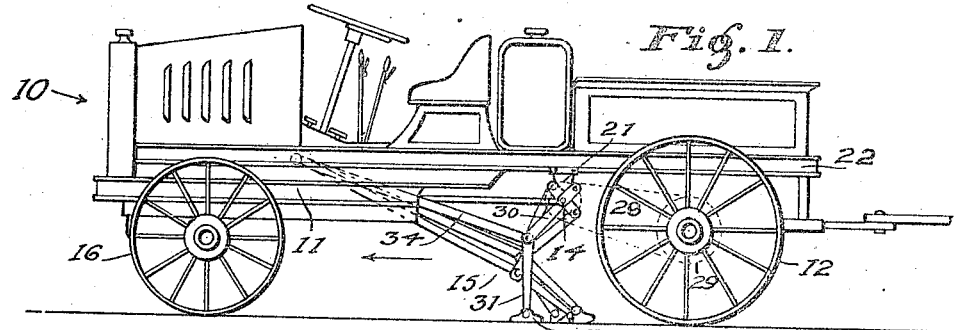
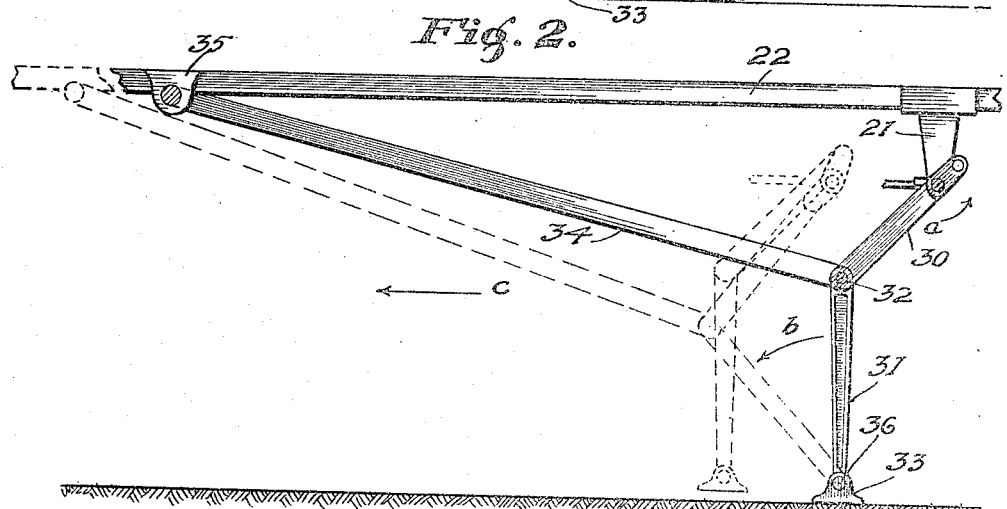
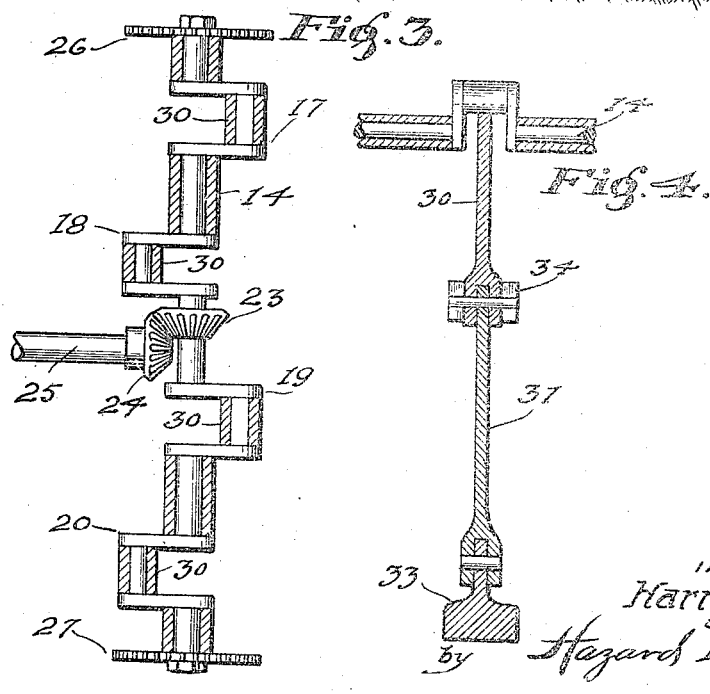
INVENTOR
Harry K. Hedges
by Hazard Berry & Miller
ATTYS.

UNITED STATES PATENT OFFICE.

HARRY K. HEDGES, OF LOS ANGELES, CALIFORNIA.

WALKING ATTACHMENT FOR MOTOR-CARS.

1,229,954.　　　　　Specification of Letters Patent.　　Patented June 12, 1917.

Application filed November 6, 1916. Serial No. 129,769.

*To all whom it may concern:*

Be it known that I, HARRY K. HEDGES, a citizen of the United States, residing at Los Angeles, in the county of Los Angeles and State of California, have invented new and useful Improvements in Walking Attachments for Motor-Cars, of which the following is a specification.

This invention relates to a vehicle construction and pertains particularly to a propulsion mechanism therefor.

When motor vehicles are used to carry heavy loads or to draw trailers over rough roads or excessive grades, it has been found difficult to obtain sufficient tractive effort from the driving wheels of the vehicle to propel it without a great loss of power. It is the principal object of this invention to provide a propulsion mechanism for vehicles which will supply the vehicle with greater tractive effort than can be obtained from the rotation of the traction wheels and at the same time propel the vehicle in a manner which will eliminate the slippage of the vehicle and the loss of power incident thereto.

Another object is to provide a vehicle propulsion means which will positively engage the ground over which the vehicle is traveling and will exert a positive force of great power to move the vehicle in a forward direction.

Another object is to provide traction means which are not limited to use upon smooth ground but which adapts itself to the irregularities of the ground over which it is passing without a material loss of tractive power.

It is a further object to provide a vehicle propulsion mechanism which is formed of few parts so designed as to withstand great force and to be simply assembled and readily operated without danger of excessive wear or breakage.

Other objects will appear hereinafter.

The invention is illustrated, by way of example, in the accompanying drawings in which:

Figure 1 is a view in side elevation illustrating a motor vehicle fitted with the propulsion mechanism.

Fig. 2 is a view in side elevation illustrating, in a diagrammatical manner, the progressive movement of one of the propulsion units.

Fig. 3 is a view in section and elevation illustrating the propulsion mechanism crank shaft and the means by which it is driven.

Fig. 4 is a view in section and elevation illustrating the construction of one of the propulsion units and its correlation to the crank shaft.

Referring to the drawings more particularly, 10 indicates a motor vehicle which is provided with a suitable power plant 11 adapted to propel the rear traction wheels 12 of the vehicle in any preferred manner. The power plant also drives a transversely disposed propulsion crank shaft 14 by which the propulsion mechanism 15 of the vehicle is driven. The front end of the vehicle is supported upon steering wheels 16. It will be understood that the detail construction of the vehicle is immaterial to the operation of the propulsion mechanism with which the present invention is concerned.

The propulsion mechanism is driven by the horizontally disposed crank shaft 14 which is provided with a series of cranks 17—20 inclusive, although any desired number of cranks may be utilized. This crank shaft is mounted by brackets 21 to vehicle frame 22 and is provided with beveled gear 23 in mesh with a driving pinion 24 by which it is rotated. The pinion 24 is mounted upon the end of a propeller shaft 25 which is driven by the power plant 11. As shown in Fig. 3 of the drawings, driving sprockets 26 and 27 are mounted upon the outer ends of the crank shaft and drive the traction wheels 12 by chains 28 which engage sprockets 29. This construction, however, may be varied if desired. Pivotally secured to each of the cranks of the crank shaft is a pitman rod 30 which is pivotally secured at its outer free end to a propulsion leg 31, by means of a pivot pin 32. The leg 31 is adapted to normally hang free in a dependent manner from the pivot pin 32. The leg is fitted with a shoe 33 which is provided to bear upon the ground during the propulsion operation. The pivot pin 32 also serves as a pivotal mounting for one end of a thrust rod 34, the opposite end of which is pivotally fixed to the vehicle frame by a bracket 35. The bracket 35 is positioned at the forward end of the vehicle and transmits the propulsion effort of the mechanism to the vehicle. It will be understood that each of the cranks formed upon the shaft 14 is provided with a pitman rod, a leg, foot and a thrust rod, which are assembled to form propulsion units and to successively operate to advance the vehicle.

Reference being had to Fig. 2 of the drawings, it will be seen that the propulsion unit shown is in the act of exerting its force to advance the vehicle. The initial position of the unit is shown in full lines and two successive positions shown in dotted lines. The leg 31 extends vertically while the pitman rod extends upwardly and rearwardly therefrom and in longitudinal alinement with its crank, while in the initial position. At the beginning of the power stroke the axis of the crank, the axis of the crank shaft, and the axis of pin 32 are in alinement. As the crank shaft rotates in the direction indicated by the arrow —a—, the pitman rod will be advanced to swing the leg upon a pivot pin 36, by which it is secured to the foot 33, in the direction of arrow —b—. This action will cause the foot 33 to forcefully bear upon the ground and will cause a thrust to be exerted upon thrust rod 34 and thereafter delivered to the vehicle frame. Due to the fact that the foot 33 is temporarily fixed to the ground, the thrust exerted upon the thrust rod will cause the vehicle to advance in the direction of the arrow —c— until the pitman and its crank have moved a half revolution from the initial point of their power stroke, after which the pitman and thrust rod will act to raise the leg 31 from the ground as shown in dotted lines. This action will cause the leg to again swing free and hang perpendicularly pending a second actuation by the crank and pitman rod. The propulsion units act successively and thereby exert a continuous thrust upon the vehicle frame to advance it at a slow rate of speed and with great force. An analysis of the mechanism will disclose the fact that leg 31 and thrust rod 34 coact to produce a toggle action which, in this case, is actuated by the rod 30 which is given a short power stroke by the crank. By this arrangement the power plant which normally propels the rear wheels of the vehicle will be enabled to exert a far greater tractive force than would otherwise have been possible.

It will thus be seen that the vehicle propulsion mechanism here provided is simple in its construction, not liable to become inoperative, and acts in a positive and powerful manner to propel a motor vehicle.

While I have shown the preferred construction of my vehicle propulsion mechanism as now known to me, it will be understood that various changes in the combination, construction and arrangement of parts may be made by those skilled in the art without departing from the spirit of my invention.

I claim:

1. In a propulsion mechanism for motor vehicles, the combination with a power plant, of a crank shaft disposed transversely of the vehicle frame and adapted to be driven by said power plant, pitman rods pivotally secured to each of the cranks of said shaft, leg members adapted to be pivotally suspended from the free end of said pitman rods, and means whereby rotation of said crank shaft will act to propel the vehicle.

2. In a propulsion mechanism for vehicles, the combination with a power plant mounted thereupon, of a crank shaft disposed transversely of said vehicle frame and adapted to be driven by said power plant, a pitman rod pivotally secured to each of the cranks of said shaft, a downwardly depending leg member pivotally secured to the free end of said pitman rod, a foot pivotally secured at the lower end of said leg and adapted to bear upon the ground during the act of propulsion, and means whereby the rotation of said crank shaft will act upon the pitman rod and the leg to propel the vehicle.

3. In a propulsion mechanism for vehicles, the combination with a power plant, of a crank shaft mounted transversely of the vehicle frame and adapted to be rotated by the power plant, a pitman rod pivotally secured to each of the cranks of said shaft, a leg pivotally secured to the free end of each of said pitman rods and adapted to depend downwardly, a foot pivotally secured to the lower end of each of said legs, and a thrust rod secured at one end to the frame of the vehicle and at its other end to the pivotal mounting of the leg in relation to the pitman rod, whereby rotation of the crank shaft will act to exert a force of propulsion upon the vehicle.

In testimony whereof I have signed my name to this specification.

HARRY K. HEDGES.

Copies of this patent may be obtained for five cents each, by addressing the "Commissioner of Patents, Washington, D. C."